(12) United States Patent
Nguyen et al.

(10) Patent No.: US 11,312,895 B2
(45) Date of Patent: Apr. 26, 2022

(54) LOADED, SEALED NANOTUBES FOR OIL RECOVERY

(71) Applicant: The Administrators of the Tulane Educational Fund, New Orleans, LA (US)

(72) Inventors: Duy T. Nguyen, Richmond, TX (US); Vijay Thomas John, Destrehan, LA (US)

(73) Assignee: The Administrators of the Tulane Educational Fund, New Orleans, LA (US)

(*) Notice: Subject to any disclaimer, the term of this patent is extended or adjusted under 35 U.S.C. 154(b) by 0 days.

(21) Appl. No.: 16/901,528

(22) Filed: Jun. 15, 2020

(65) Prior Publication Data
US 2020/0392398 A1    Dec. 17, 2020

Related U.S. Application Data

(60) Provisional application No. 62/861,510, filed on Jun. 14, 2019.

(51) Int. Cl.
*C09K 8/584* (2006.01)
*E21B 43/16* (2006.01)
(Continued)

(52) U.S. Cl.
CPC .............. *C09K 8/70* (2013.01); *C09K 8/584* (2013.01); *C09K 8/80* (2013.01); *E21B 43/16* (2013.01);
(Continued)

(58) Field of Classification Search
CPC . C09K 8/70; C09K 8/584; C09K 8/80; C09K 2208/06; C09K 2208/10; C09K 2208/32; E21B 43/16; E21B 43/26
See application file for complete search history.

(56) References Cited

U.S. PATENT DOCUMENTS 9,068,109 B2    6/2015   Rana et al.
2007/0292459 A1* 12/2007  Cooper .................... A61K 8/26
                                                424/401
(Continued)

FOREIGN PATENT DOCUMENTS

WO    2018022070 A1    7/2016
WO    2019/099022 A1   5/2019

OTHER PUBLICATIONS

Nyankson et al., "Surfactant-Loaded Halloysite Clay Nanotube Dispersants for Crude Oil Spill Remediation", Industrial and Engineering Chemistry Research, vol. 54, No. 38, pp. 9328-9341 (2015).
Cavallaro et al., "Structure of Hybrid Materials Based on Halloysite Nanotubes Filled with Anionic Surfactants", J. Phys Chem., vol. 120 (25), pp. 13492-13502 (2016).
(Continued)

*Primary Examiner* — Silvana C Runyan
(74) *Attorney, Agent, or Firm* — Marshall, Gerstein & Borun LLP (57) ABSTRACT

Surfactants are imbibed into Halloysite nanotubes (HNT) and the imbibed nanotubes are coated with wax on the nanotube outer surface. The wax layer prevents the surfactant from being disgorged from the HNT lumen until a triggering condition exists. Triggering conditions include contact with oil, which dissolves the wax; or exposure to temperatures above a melt transition of the wax, which causes the wax to melt. Upon exposure to a triggering condition, at least some of the imbibed surfactants are disgorged from the HNT and into the surrounding environment. The disgorged surfactants provide a conventional effect of reducing interfacial tension and changing reservoir rock wettability to enhance oil recovery. A range of surfactants and waxes are usefully employed in the compositions and methods described herein.

20 Claims, 3 Drawing Sheets

(51) Int. Cl.
    *C09K 8/70*     (2006.01)
    *C09K 8/80*     (2006.01)
    *E21B 43/26*     (2006.01)

(52) U.S. Cl.
    CPC .......... *E21B 43/26* (2013.01); *C09K 2208/06* (2013.01); *C09K 2208/10* (2013.01); *C09K 2208/32* (2013.01)

(56) References Cited

U.S. PATENT DOCUMENTS

| | | | |
|---|---|---|---|
| 2014/0349894 A1 | 11/2014 | Quintero et al. | |
| 2017/0247598 A1* | 8/2017 | Kennedy | E21B 33/138 |
| 2017/0327727 A1* | 11/2017 | Dreyer | C09K 8/68 |
| 2019/0194529 A1* | 6/2019 | Han | C04B 35/62805 |

OTHER PUBLICATIONS

Ojo et al., "A Nanocomposite of Halloysite/Surfactant/Wax to Inhibit Surfactant Adsorption onto Reservoir Rock Surfaces for Improved Oil Recovery", American Chemical Society, Energy & Fuels, 11 pages (2020).

International Search Report for International Application No. PCT/US2020/037739, dated Sep. 25, 2020, 6 pages.

Written Opinion for International Application No. PCT/US2020/037739, dated Sep. 25, 2020, 8 pages.

Ojo et al., "Stoppers and Skins on Clay Nanotubes Help Stabilize Oil-in-Water Emulsions and Modulate the Release of Encapsulated Surfactants", ACS Applied Nano Materials, vol. 2, No. 6, 2019, pp. 3490-3500.

Farinmade et al., "Targeted and Stimulus-Responsive Delivery of Surfactant to the Oil-Water Interface for Applications in Oil Spill Remediation", ACS Applied Materials & Interfaces, vol. 12, No. 1, 2020, pp. 1840-1849.

* cited by examiner

LOADED, SEALED NANOTUBES FOR OIL RECOVERY

FIELD OF THE INVENTION

The present invention generally relates to compositions and methods for increased recovery of crude oil from a subterranean hydrocarbon-containing formation.

BACKGROUND

Chemical additives are used throughout the petroleum industry for increasing the rate or total amount of hydrocarbon compounds recovered from subterranean hydrocarbon-bearing reservoirs. Conventionally, chemical additives including one or more surfactants (and optionally other materials such as polymers) are combined with a fluid, usually a water source, and this combination is injected underground. Such combinations may be referred to as "injectates." The injected surfactants lower the interfacial tension between the fluid and/or connate (subterranean water source) and the hydrocarbon (oil); and may further change the wettability of the reservoir rock, thereby increasing the yield of hydrocarbon compounds released and/or the rate of their recovery.

Injectates are suitably optimized maximizing yield of hydrocarbon recovery from a subterranean reservoir, maximizing the rate of recovery of hydrocarbon from a subterranean reservoir, or both. Such use may be before or after establishment of a well, wherein "well" is understood to indicate a fluid connection between a hydrocarbon within a subterranean reservoir, and a point proximal to the surface of the earth suitably situated to allow collection of the hydrocarbon from the reservoir. In man-made wells, this point may be referred to as a wellbore, which is a man-made fluid connection to a subterranean hydrocarbon-bearing reservoir. The wellbore may be adapted to collect hydrocarbon, to inject one more injectates, or both by including one or more pipes, tanks, pumps and the like. The use of injectates is not generally limited by the type of reservoir or the type of hydrocarbon, and injectates are injected into nearly every such formation in order to maximize yield of hydrocarbon obtained from the reservoir.

For example, injectates may be injected contemporaneously with establishment of a well, such as by hydraulic fracturing. An injectate may suitably be combined with a proppant, wherein the combination is a fracturing fluid. The fracturing fluid is used in a hydraulic fracturing process to establish a well. Surfactants present in the fracturing fluid may achieve well stimulation during fracturing, wherein applied hydraulic pressure can further assist in distributing the surfactants within the reservoir. Hydraulic fracturing techniques are useful to form new wells as well as to extend the life of existing wells. Injectates including surfactants are known to be useful in both of these applications.

Injectates are also used in enhanced recovery of hydrocarbons from wells. "Enhanced hydrocarbon recovery" refers to processes carried out after a well is established for the purpose of increasing the rate or total amount of hydrocarbon collected. Enhanced hydrocarbon recovery is typically initiated once a reduction in the rate of collection of hydrocarbon from the well is observed, in order to "reinvigorate" the well (often referred to in the art as secondary oil recovery) and/or when collection has substantially stopped (often referred to in the art as tertiary oil recovery). Injectates for enhanced hydrocarbon recovery conventionally include surfactants and/or polymers.

An ongoing problem faced by operators seeking to enhance rate or total yield of hydrocarbon recovery using surfactants in injectates and fracturing fluids is that surfactants in particular are prone to adsorbing substantially onto one or more rock surfaces after injection, depleting the surfactant quickly at the expense of deeper-lying rock surfaces and in some cases depleting most or even substantially all of the surfactant before the injectate contacts a subterranean hydrocarbon source. In response, operators may use large excesses of surfactant to overcome the depletion; this in turn incurs undue expense and contamination of groundwater (connate) sources.

For at least the foregoing reasons, there is a need in the industry to target injected surfactants for oil recovery without depleting a surfactant before the injectate contacts a subterranean hydrocarbon source. There is a further need to reduce the total amount of surfactant present in an injectate, since such reduction translates to reduced cost and reduced subterranean pollution or groundwater contamination. There is a need to accomplish the foregoing goals without compromising the superior performance associated with conventional surfactants and blends thereof employed throughout the oil recovery industry.

There is a need to accomplish the foregoing using naturally sourced materials, thereby avoiding undue subterranean pollution upon injecting injectates into the earth.

SUMMARY OF THE INVENTION

Described herein are nanotube compositions comprising, consisting essentially of, or consisting of Halloysite nanotubes (HNT) having one or more surfactant molecules disposed within an interior volume thereof (s-HNT); and a wax layer disposed on at least a portion of the s-HNT exterior surface (ws-HNT). In embodiments, the nanotube compositions comprise, consist essentially of, or consist of Halloysite nanotubes (HNT) having one or more surfactant molecules disposed within an interior volume thereof (s-HNT); and a wax layer disposed on at least a portion of the s-HNT exterior surface (ws-HNT). In embodiments, the ws-HNT consists essentially of or consists of s-HNT encapsulated in a wax layer, wherein the wax layer covers a substantial portion or the entirety of the outer surface of the nanotubes, and further covers a substantial portion or the entirety of the distal ends of the nanotube lumen. In embodiments, the weight ratio of surfactant to HNT in the s-HNT is 1:1 to 1:100. In embodiments, the weight ratio of wax to ws-HNT is 10:1 to 1:100. The wax is insoluble in water, wherein "insoluble" means less than 1 wt % dissolves in water at 20° C.

Also described herein is a method of making a ws-HNT, comprising, consisting essentially of, or consisting of imbibing an HNT with a surfactant to form an s-HNT; and contacting the s-HNT with a wax to form a ws-HNT. In embodiments, the surfactant is dissolved or dispersed in an imbibition solvent for the imbibing. In embodiments, the surfactant is dissolved or dispersed in an imbibition solvent that is water miscible, or a blend of water and a water-miscible solvent. In embodiments, the wax is dispersed in a non-aqueous solvent that is less than 1 wt % miscible with water at 20° C. for the contacting.

In embodiments, the imbibing, the contacting, or both are accompanied by a period of reduced pressure. In some embodiments, a first reduced pressure is applied to an HNT to form an s-HNT. In some embodiments, a second reduced pressure is applied to an s-HNT to form a ws-HNT. In some embodiments, the first reduced pressure, the second reduced pressure, or both reduced pressures are applied cyclically: that is, a period of reduced pressure is followed by a period of higher pressure; in embodiments the higher pressure is atmospheric pressure, while in other embodiments the higher pressure is a pressure between atmospheric pressure and the reduced pressure. Thus, in embodiments, the imbibing, the contacting, or both are accompanied by one, two, three, four, five, or more than five cycles of reduced pressure and as many as 100 or more cycles of reduced pressure. In embodiments, the reduced pressure, the higher pressure, or both may vary purposefully or incidentally over two or more cycles.

In embodiments, at least a portion of the imbibition solvent is evaporated after the imbibing. In embodiments, at least a portion of the imbibition solvent is evaporated after the contacting. In embodiments, the imbibition solvent is evaporated at a temperature below a melting transition onset temperature of the wax. In some embodiments, evaporating is accomplished by adding heat, lowering a pressure to below atmospheric pressure, or both.

Also described herein is a method of enhanced oil recovery, the method including at least combining a ws-HNT with water to form an injectate; injecting the injectate into a subterranean reservoir; and collecting a hydrocarbon from the subterranean reservoir.

Other objects and features will be in part apparent and in part pointed out hereinafter.

DETAILED DESCRIPTION

Although the present disclosure provides references to preferred embodiments, persons skilled in the art will recognize that changes may be made in form and detail without departing from the spirit and scope of the invention. Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Definitions

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "and" and "the" include plural references unless the context clearly dictates otherwise. The present disclosure also contemplates other embodiments "comprising," "consisting of" and "consisting essentially of," the embodiments or elements presented herein, whether explicitly set forth or not.

In some embodiments herein, the terms "optional" or "optionally" mean that a described event or circumstance may but need not occur, and that the description includes instances where the event or circumstance occurs and instances in which it does not.

In some embodiments herein, the term "about" modifying, for example, the quantity of an ingredient in a composition, concentration, volume, process temperature, process time, yield, flow rate, pressure, and like values, and ranges thereof, employed in describing the embodiments of the disclosure, may refer to variation in the numerical quantity that can occur, for example, through typical measuring and handling procedures used for making compounds, compositions, concentrates or use formulations; through inadvertent error in these procedures; through differences in the manufacture, source, or purity of starting materials or ingredients used to carry out the methods, and like proximate considerations. The term "about" may encompass amounts that differ due to aging of a formulation with a particular initial concentration or mixture, and amounts that differ due to mixing or processing a formulation with a particular initial concentration or mixture. Where modified by the term "about" the claims appended hereto may include equivalents to these quantities. Further, where "about" is employed to describe a range of values, for example "about 1 to 5" the recitation may mean "1 to 5" and "about 1 to about 5" and "1 to about 5" and "about 1 to 5" unless specifically limited by context.

In some embodiments herein, the term "substantially" may mean "consisting essentially of", as that term is construed in U.S. patent law, and includes "consisting of" as that term is construed in U.S. patent law. For example, a solution that is "substantially free" of a specified compound or material may be free of that compound or material, or may have a minor amount of that compound or material present, such as through unintended contamination, side reactions, or incomplete purification. A "minor amount" may be a trace, an unmeasurable amount, an amount that does not interfere with a value or property, or some other amount as provided in context. A composition that has "substantially only" a provided list of components may consist of only those components, or have a trace amount of some other component present, or have one or more additional components that do not materially affect the properties of the composition. Additionally, "substantially" modifying, for example, the type or quantity of an ingredient in a composition, a property, a measurable quantity, a method, a value, or a range, employed in describing the embodiments of the disclosure, refers to a variation that does not affect the overall recited composition, property, quantity, method, value, or range thereof in a manner that negates an intended composition, property, quantity, method, value, or range. Where modified by the term "substantially" the claims appended hereto may include equivalents according to this definition.

In some embodiments, recited ranges of values contemplate all values within the range and are to be construed as support for claims reciting any sub-ranges having endpoints which are real number values within the recited range. By way of a hypothetical illustrative example, a disclosure in this specification of a range of from 1 to 5 may be considered to support claims to any of the following ranges: 1-5; 1-4; 1-3; 1-2; 2-5; 2-4; 2-3; 3-5; 3-4; and 4-5.

Discussion

Described herein are nanotube compositions comprising, consisting essentially of, or consisting of Halloysite nanotubes (HNT) having one or more surfactant molecules disposed or imbibed within an interior volume thereof (s-HNT); and a wax layer disposed on at least a portion of the s-HNT exterior or outer surface (ws-HNT). Methods of making ws-HNT are also described herein. Methods of using the ws-HNT are also described herein.

A nanotube is a discrete particulate structure having a hollow cylindrical morphology with a cylinder outer diameter of 1 micron or less and a ratio of length to outer diameter of 10 to 10,000. The nanotube structure includes an outer surface defining an outer diameter, and an inner surface defining an inner diameter, the inner and outer surfaces defining a length having distal ends, the inner surface further defining a channel or lumen extending between the distal ends thereof; further wherein the ratio of particle length to outer diameter is 10 to 1000.

Halloysite ($Al_2Si_2O_5(OH)_4 \cdot 2H_2O$) is a layered aluminosilicate nanotube that is chemically similar to kaolin. Generally, the nanotubes are bilayered or have a multiple bilayer structure. Bilayer structures are formed by neighboring alumina and silica layers, further wherein associated waters of hydration cause a natural curving or curling to result in a characteristic cylindrical morphology having different chemistries on the inner and outer surfaces thereof. Halloysite may be mined from the corresponding deposit as a raw mineral. Since they are natural materials, Halloysite particle dimensions are variable. Generally, the length of a Halloysite nanotube cylinder is 10 nanometers (nm) to 10 microns (μm), often about 100 nm to about 2 μm, and the inner surface diameter (defining the lumen diameter and the diameter of the distal ends) is 5 nm to 150 nm, often about 15 nm. Outer surface diameter is dictated by the number of bilayers, wherein one bilayer is reported by various sources to be 7 Å thick.

A surfactant for imbibition is selected based on a conventional understanding or knowledge that the surfactant results in increased yield of hydrocarbon, such as crude oil, from subterranean reservoirs; and/or results in increased rate of hydrocarbon recovery, by lowering a subterranean interfacial tension.

In embodiments, the weight ratio of surfactant to s-HNT in the ws-HNT is 100:1 to 1:100, more often about 1:1 to 1:100; for example, 50:1 to 1:100, or 20:1 to 1:100, or 10:1 to 1:100, or 1:5 to 1:100, or 1:10 to 1:100, or 1:20 to 1:100, or 1:30 to 1:100, or 1:40 to 1:100, or 1:50 to 1:100, or 1:60 to 1:100, or 1:70 to 1:100, or 1:80 to 1:100, or 1:90 to 1:100, or 1:1 to 1:90, or 1:1 to 1:80, or 1:1 to 1:70, or 1:1 to 1:60, or 1:1 to 1:50, or 1:1 to 1:40, or 1:1 to 1:30, or 1:1 to 1:20, or 1:1 to 1:10, or 1:1 to 1:9, or 1:1 to 1:8, or 1:1 to 1:7, or 1:1 to 1:6, or 1:1 to 1:5, or 1:1 to 1:4, or 1:1 to 1:3, or 1:1 to 1:2.

The type of surfactant employed to form an s-HNT, which is an intermediate in the formation of a ws-HNT, is not particularly limited. Anionic, cationic, and nonionic surfactants are usefully imbibed into the volume defined by an HNT lumen. Many s-HNT compositions have been posited and synthesized. Limiting factors in some embodiments are surfactant molecular weight, for example wherein a polymeric surfactant molecule is too large to fit inside the lumen of the HNT; and compatibility of the surfactant with the HNT interior. The latter factor is due to the cationic character of the HNT lumen interior surface, which in a purified HNT consists of or consists essentially of alumina arising naturally during HNT formation as discussed above. The lumen interior may be incompatible with a particular surfactant—or it may be sufficiently compatible that the surfactant is difficult to remove and thus cannot achieve the end purpose of the ws-HNT: the release of the surfactant upon melting or dissolution of the wax.

Useful surfactants for forming the s-HNT include any ionic or nonionic, non-polymeric surfactant or mixture thereof. In embodiments, a surfactant is selected based on the conventional understanding or knowledge that the surfactant is usefully employed for obtaining increased yield of hydrocarbon, such as crude oil, from subterranean reservoirs by lowering a subterranean interfacial tension.

Blends of two or more surfactants are useful for adjusting a subterranean interfacial tension. Thus, a customized surfactant blend or a single surfactant source may be used to provide specific properties of dispersibility or to target a specific interfacial tension. In the context of this application, "surfactant" means one or more than one surfactant, in any proportion, as determined by context.

The surfactant or blend thereof may include without limitation one or more compounds that are active to reduce a surface tension or to reduce an interfacial tension. In embodiments, a surfactant includes one or more hydrophobic moieties covalently bonded to one or more hydrophilic moieties. Hydrophobic moieties are linear, branched, cyclic, aromatic, or aralkyl moieties having 8-50 carbons (C8-C50), for example C8-C40, C8-C30, C10-C30, C12-C30, C8-C24, C10-C24, C12-C24, C8-C18, C8-C16, C12-C24, C10-C18, C12-C18, or C10-C16.

Examples of useful hydrophilic moieties include anionic functionalities such as sulfonate or carboxylate; cationic functionalities such as ammonium or phosphonium; and nonionic moieties such as ethylene oxide or methylene oxide. One, two, or more hydrophilic moieties may be bonded to a single surfactant molecule. In embodiments the surfactant is an amphoteric surfactant such as a betaine or a sultaine. Counterions associated with ionic moieties are not recited here for brevity, but are not particularly limited. In some embodiments, non-polymeric surfactants provide better packing during imbibition; but in other embodiments polymeric or oligomeric surfactants are useful for forming the s-HNT.

In embodiments, s-HNT are formed by imbibition of a surfactant into an HNT. In some such embodiments the HNT is a purified HNT, wherein "purified" in this context means that an ore or other earth extract or a product thereof is processed to preferentially collect the HNT and exclude other materials; and "purifying" an HNT means to conduct one or more such processes prior to using the purified HNT to form an s-HNT. In any of the foregoing embodiments, imbibition is suitably accomplished by contacting the HNT with an imbibition solvent and the selected surfactant, resulting in formation of s-HNT.

Many reported examples are available describing imbibition of surfactants into HNT lumen to form s-HNT, and any of these reported s-HNT are useful to form ws-HNT according to the compositions and methods disclosed herein. One of skill will recognize in view of the available art that the exemplary embodiments demonstrated herein are only for illustrative purposes and are not limiting as to the amount or type of surfactant employed to make the s-HNT. Several s-HNT, and methods of making them, are disclosed, for example, in International Application Publication WO 00/52301; Cavallaro et al., *J. Phys. Chem. C* 2016, 120, 13492-13502; Nyankson et al., *Ind. Eng. Chem. Res.* [BIB]; and Owoseni et al., *Langmuir* 2014, 30, 13533-13541. These and other publications describe suitable s-HNT that are useful in any one or more of the foregoing embodiments as starting materials to form ws-HNT; and further describe methods of making s-HNT that are useful in any one or more of the foregoing embodiments to make starting materials for forming ws-HNT.

An exemplary surfactant used for conventional chemical flooding (enhanced oil recovery, or EOR) as well as for increasing hydrocarbon flowback in connection with hydraulic fracturing, is polyoxyethylene(20) sorbitan monooleate, a nonionic surfactant sold by various sources as TWEEN® 80. Another surfactant used for EOR is ionic but with a net charge per molecule of zero—that is, a zwitterionic surfactant. Exemplary zwitterionic surfactants include betaines and sultaines, for example C10-C16 alkyl (2-hydroxy-3-sulfopropyl)dimethyl betaine, sold by ChampionX of The Woodlands, Tex. Other surfactants, and mixtures of surfactants, employed for oil recovery may similarly be used. The type of surfactant or blend of two or more thereof is not particularly limited.

In embodiments, an HNT is imbibed by contacting the HNT with an imbibition solvent and a surfactant, resulting in formation of s-HNT. In any of the embodiments herein, the selected surfactant or surfactant mixture may be dispersed in the imbibition solvent at any ratio that facilitates dispersion or dissolution, and mixing, of both the HNT and the selected surfactant. The imbibition solvent is in some embodiments water, a solvent that is water miscible, a or a blend of water and one or more water-miscible solvents. In embodiments, a selected surfactant or a mixture of surfactants is dispersed in water, and water is the imbibition solvent (and may further include optional agents such as pH adjustment agents and the like). In other embodiments the imbibition solvent is an aqueous solution of water and one or more water-miscible solvents. In some embodiments, a hydrotrope is included in the imbibition solvent to facilitate dispersion of HNT, surfactant, or both. In some embodiments, the imbibition solvent may include one or more agents to adjust the pH of the imbibition solvent.

In any of the foregoing embodiments, the selected surfactant or surfactant mixture is dispersed in the imbibition solvent at any ratio that facilitates dispersion and mixing of the HNT and the selected surfactant. In some embodiments, a hydrotrope is included in the imbibition solvent to facilitate dispersion of HNT, surfactant, or both. In embodiments, the solvent is recoverable by evaporation and may further be re-used to disperse a fresh batch of surfactant for imbibition. Useful and non-limiting imbibition solvents include water, methanol, ethanol, acetone, methyl ethyl ketone, isopropanol, benzene, and toluene. Blends of these, further with other solvents and/or hydrotropes, are usefully employed as the imbibition solvent.

In embodiments, the imbibing is contacting the HNT with the surfactant dissolved or dispersed in the imbibition solvent. In some embodiments, the contacting is accompanied by a reduced pressure. Reduced pressure means sub-atmospheric pressure, or pressure of less than 1 atm. Reducing pressure in the presence of dissolved or dispersed surfactant increases the rate of imbibition of surfactant by the HNT to form s-HNT.

In some embodiments, a first reduced pressure is applied to the combination of HNT, surfactant, and imbibition solvent. In some embodiments, the first reduced pressure is applied cyclically, wherein a period of reduced pressure is followed by a period of higher pressure. In some embodiments the higher pressure is atmospheric pressure, while in other embodiments the higher pressure is a pressure between atmospheric pressure and the first reduced pressure. Thus, in embodiments, the imbibing, the contacting, or both are accompanied by one, two, three, four, five, or more than five cycles of reduced pressure and as many as 100 or more cycles of reduced pressure. In some embodiments the first reduced pressure is the same as the reduced pressure applied in subsequent cycles, while in other embodiments the reduced pressure is variable between cycles. That is, in embodiments, the first reduced pressure, the higher pressure, or both may vary purposefully or incidentally over two or more cycles.

In some embodiments the imbibition, including embodiments wherein a reduced pressure is applied, is accompanied by a targeted temperature of $-40°$ C. to $100°$ C., such as $0°$ C. to $100°$ C., or $20°$ C. to $100°$ C., or $40°$ C. to $100°$ C., or $60°$ C. to $100°$ C., or $80°$ C. to $100°$ C., or $-40°$ C. to $90°$ C., or $-40°$ C. to $90°$ C., or $-40°$ C. to $80°$ C., or $-40°$ C. to $70°$ C., or $-40°$ C. to $60°$ C., or $-40°$ C. to $50°$ C., or $-40°$ C. to $40°$ C., or $-40°$ C. to $30°$ C., or $-40°$ C. to $20°$ C., or $-40°$ C. to $10°$ C., or $-40°$ C. to $0°$ C. In some embodiments, the imbibition is continued for a period of about 1 minute to 24 hours after contact of the HNT, imbibition solvent, and surfactant(s), for example 10 minutes to 24 hours, or 30 minutes to 24 hours, or 1 hour to 24 hours, or 5 hours to 24 hours, or 10 hours to 24 hours, or 15 hours to 24 hours, or 1 minute to 15 hours, or 1 minute to 5 hours, or 1 minute to 1 hour. The period is accompanied by 0 to 1000 cycles of a first reduced pressure to result in an s-HNT.

In some embodiments, after imbibition is complete, the imbibition solvent is removed or is substantially removed from the s-HNT by evaporation, optionally under reduced pressure and optionally by adding heat to the s-HNT in the imbibition solvent. It is not necessary to completely remove the solvent from the s-HNT. In some embodiments, the imbibition solvent is not removed after completion of imbibition. In such embodiments, the imbibition solvent is included as the contacting solvent or as part of the contacting solvent in a subsequent step to form ws-HNT from the s-HNT.

After the s-HNT is formed, and optionally after further removing a portion or all of the imbibition solvent, the s-HNT is contacted with a wax to form a ws-HNT. In embodiments, the ws-HNT includes a layer of wax disposed substantially on the outer or exterior surface of the nanotube. In embodiments, the wax layer extends at least partly across the distal ends of the HNT nanotube lumen or channel. In embodiments, the wax layer extends completely across the distal ends of the HNT nanotube lumen or channel, effectively blocking the distal ends of the lumen and preventing the imbibed surfactant from exiting the lumen.

Waxes are hydrophobic compounds having melting points, or melting transition onsets, of over $40°$ C., for example between $40°$ C. and $200°$ C., or between $50°$ C. and $170°$ C., or between $60°$ C. and $150°$ C., or between $70°$ C. and $120°$ C. "Hydrophobic" in this context means having solubility in water of less than 1 wt % at $25°$ C. In embodiments, the wax used to form the ws-HNT is insoluble in water, wherein "insoluble in water" means less than 1 wt % will dissolve in water at $20°$ C.

Any of the known waxes are usefully employed to contact an s-HNT to result in a ws-HNT. Suitable waxes for contacting an s-HNT to form a ws-HNT include paraffin wax, animal waxes, vegetable waxes, mineral waxes, synthetic waxes, bayberry wax, beeswax, carnauba wax, microcrystalline wax, petrolatum, stearyl dimethicone, stearyl trimethicone, ethylene-α-olefin copolymers, C18-C45 olefins, and ethylene or propylene oligomers and short chain homopolymers as well as copolymers thereof. In some embodiments, short chain polyolefin waxes of ethylene, propylene, or both, are formed using Fischer-Tropsch catalysts or other specialized catalysts in order to induce high density (over 0.95 g/cm$^3$) which in turn results from the high crystalline content in the solid wax.

Blends of two or more waxes are useful for adjusting solubility and/or melt transition properties of the wax layer deposited on the nanotube outer or exterior surface and therefore for customizing the wax layer to target a specific melting temperature, melt transition onset, or melting range of temperatures; or to target a specific solubility, or both. In the context of this application, "wax" or "wax blend" means one or more than one wax, in any proportion, present as a mixture thereof.

In embodiments, the weight ratio of wax to s-HNT in the ws-HNT is about 10:1 to 1:100, such as 9:1 to 1:100, or 8:1 to 1:100, or 7:1 to 1:100, or 6:1 to 1:100, or 5:1 to 1:100, or 4:1 to 1:100, or 3:1 to 1:100, or 2:1 to 1:100, or 1:1 to 1:100, or 1:1 to 1:100, or 1:10 to 1:100, or 1:20 to 1:100, or 1:30 to 1:100, or 1:40 to 1:100, or 1:50 to 1:100, or 1:60 to 1:100, or 1:70 to 1:100, or 1:80 to 1:100, or 1:90 to 1:100, or 10:1 to 1:90, or 10:1 to 1:80, or 10:1 to 1:70, or 10:1 to 1:60, or 10:1 to 1:50, or 10:1 to 1:40, or 10:1 to 1:30, or 10:1 to 1:20, or 10:1 to 1:10, or 10:1 to 1:1, or 10:1 to 1:10, 5:1 to 1:5, or 1:1 to 1:100, or 1:1 to 1:50, or 1:1 to 1:10, or 1:1 to 1:5, or 10:1 to 20:1, or 10:1 to 30:1, or 10:1 to 40:1, or 10:1 to 50:1, or 10:1 to 60:1, or 10:1 to 70:1, or 10:1 to 80:1, or 10:1 to 90:1.

Also described herein is a method of making a ws-HNT, comprising, consisting essentially of, or consisting of imbibing an HNT with a surfactant to form an s-HNT; and contacting the s-HNT with a wax to form a ws-HNT.

Thus, in embodiments, an s-HNT is coated with a wax layer by contacting the HNT with a wax dissolved or dispersed in a contacting solvent, to result in formation of a ws-HNT. Methods of coating wax onto the exterior surface of a nanotube include dispersing or dissolving the wax in a solvent that will not disperse or dissolve the surfactant. In embodiments, the solvent is recoverable by evaporation. Useful and non-limiting contacting solvents include C5-C12 alkanes including hexane, heptane, and octane; benzene, and toluene. Blends of these, further with other solvents, are usefully employed as the contacting solvent.

In embodiments, the ws-HNT is formed by contacting an s-HNT with a wax, wherein the wax is dissolved or dispersed in the contacting solvent. In embodiments, the contacting solvent includes at least one solvent that is also in the imbibition solvent. In some embodiments, the contacting includes fluidized bed contact of the s-HNT with the wax, wherein the wax is molten (wax having a viscosity of less than 10 cP, often less then 2 cP) or dissolved in the contacting solvent. In some embodiments, the contacting is accompanied by a force in excess of gravity, that is, greater than 1G. Such contacting embodiments include the step of contacting the s-HNT and the wax within a centrifuge or a hydrocyclone.

In some embodiments, the contacting is accompanied by a reduced pressure. Reduced pressure means sub-atmospheric pressure, or pressure of less than 1 atm. Reducing pressure in the presence of dissolved or dispersed wax increases the rate of layer deposition of wax on the s-HNT to form the ws-HNT.

In some embodiments, a first reduced pressure is applied to the combination of HNT, surfactant, and imbibition solvent to form an s-HNT. In some embodiments, a second reduced pressure is applied to the combination of contacting solvent, s-HNT and wax to form a ws-HNT. In some embodiments, the second reduced pressure is applied cyclically, wherein a period of reduced pressure is followed by a period of higher pressure. In some embodiments the higher pressure is atmospheric pressure, while in other embodiments the higher pressure is a pressure between atmospheric pressure and the second reduced pressure. Thus, in embodiments, the imbibing, the contacting, or both are accompanied by one, two, three, four, five, or more than five cycles of reduced pressure and as many as 100 or more cycles of reduced pressure or even 1000 or more cycles of reduced pressure. In some embodiments the second reduced pressure is the same as the reduced pressure applied in subsequent cycles, while in other embodiments the second reduced pressure is variable between cycles. That is, in embodiments, the second reduced pressure, the higher pressure, or both may vary purposefully or incidentally over two or more cycles.

In some embodiments the contacting, including embodiments wherein a reduced pressure is applied, is accompanied by a targeted temperature of −40° C. to 100° C., such as 0° C. to 100° C., or 20° C. to 100° C., or 40° C. to 100° C., or 60° C. to 100° C., or 80° C. to 100° C., or −40° C. to 90° C., or −40° C. to 90° C., or −40° C. to 80° C., or −40° C. to 70° C., or −40° C. to 60° C., or −40° C. to 50° C., or −40° C. to 40° C., or −40° C. to 30° C., or −40° C. to 20° C., or −40° C. to 10° C., or −40° C. to 0° C. In some embodiments, the contacting is continued for a period of about 1 minute to 24 hours after contact of the s-HNT, contact solvent, and wax, for example 10 minutes to 24 hours, or 30 minutes to 24 hours, or 1 hour to 24 hours, or 5 hours to 24 hours, or 10 hours to 24 hours, or 15 hours to 24 hours, or 1 minute to 15 hours, or 1 minute to 5 hours, or 1 minute to 1 hour. The period is accompanied by 0 to 1000 cycles of a second reduced pressure to result in a ws-HNT.

In some embodiments, after contacting is complete, the contacting solvent is removed or is substantially removed from the ws-HNT by evaporation, optionally under reduced pressure and optionally by adding heat to the ws-HNT in the contacting solvent. It is not necessary to completely remove the solvent from the s-HNT. In some embodiments, the contacting solvent is not removed after completion of contacting to form the wax layer of the ws-HNT.

In embodiments, at least a portion of the contacting solvent is evaporated after the contacting. In embodiments, the contacting solvent is evaporated at a temperature below a melting transition onset temperature of the wax. In some embodiments, evaporating is accomplished by adding heat, lowering a pressure to below atmospheric pressure, or both adding heat and lowering a pressure.

After the ws-HNT is formed, and optionally after further removing a portion or all of the contacting solvent, the ws-HNT is used to form an injectate, or optionally is stored either as a dry particulate or as a dispersion of ws-HNT in the contacting solvent. The ws-HNT, either dry or dispersed in a contacting solvent, are stable for at least 1 week, at least 1 month, at least 1 year, 1 year to 10 years, or 1 year to 5 years, or 1 year to 2 years when stored dry and wherein the temperature during storage does not exceed the melt transition onset temperature of the wax present in the ws-HNT composition.

Also described herein is a method of enhanced oil recovery, the method including at least mixing a ws-HNT with water to form an injectate; injecting the injectate into a subterranean reservoir; and collecting a hydrocarbon from the subterranean reservoir.

The methods enable the contact of subterranean environments with surfactants when a triggering condition is present. Triggering conditions are those that result in removal of wax from the ws-HNT outer/exterior surface. Such conditions result in removal of the wax from the distal ends of the nanotube lumen and serve as a "switching" or triggering mechanism to disgorge surfactant from the lumen of the nanotube. Once released from the interior of the lumen, the surfactants provide conventional effects associated with surfactants, namely, reducing interfacial tension in accord with previously observed properties of conventional surfactants.

An injectate is any aqueous composition that is injected into a subterranean reservoir to bring about an increase in yield or rate of recovery of a hydrocarbon from the reservoir. Reducing the oil-water interfacial tension increases the rate of oil recovery from a subterranean reservoir and in some cases also increases total yield from the reservoir.

In embodiments, an injectate is formed by combining one or more ws-HNT with a water source. The water source is water or water with one or more solids dissolved therein. In embodiments the water source may include 0.1 wt % and as much as 5 wt % dissolved solids in the form of salts/ions. In embodiments, the water source may be at a temperature of 20° C. to 80° C. during the combining. In embodiments, an injectate includes one or more ws-HNT and water source and may further include other agents for subterranean injection, such as viscosity adjustment agents, scale control reagents, buffers, anticorrodents, and the like without limitation.

The ws-HNT may be present in an injectate at about 1 ppm to 10,000 ppm, without limitation. The amount of ws-HNT in an injectate is selected by the user (the injector) and is based on the type and amount of surfactant in the ws-HNT and the subterranean conditions known or expected, including temperature, rock composition, connate composition, and connate/hydrocarbon ratio known or expected. In some embodiments, the ws-HNT is insoluble in the water source. In some embodiments, the ws-HNT is dispersed in the water source or the injectate and does not disgorge the surfactant into the water source or injectate composition.

After injection of the injectate, the ws-HNT travels in the subterranean reservoir until encountering surfactant-disgorging conditions. Such conditions include contacting the ws-HNT with crude oil, or contacting the ws-HNT with a subterranean temperature that exceeds a melt transition temperature of the wax. In the case of contacting the ws-HNT with crude oil, the crude oil includes hydrocarbon compounds that dissolve the wax, including the wax residing at or extending across the distal ends of the nanotube lumen. At least a portion of the imbibed surfactant is released from the lumen upon dissolution of the wax, and the surfactant may disperse into the crude oil to lower a subterranean interfacial tension.

In the case of contacting the ws-HNT with a subterranean temperature that exceeds a melt transition temperature of the wax, it is known that subterranean temperatures can reach as high as 170° C.; thus, even without contacting any hydrocarbon an injectate may be subjected to wax-melting temperatures, and the wax residing at or extending across the distal ends of the nanotube lumen will similarly melt at or above a target temperature. At least a portion of the imbibed surfactant is released from the lumen upon melting of the wax, and the surfactant may disperse into the subterranean reservoir to lower an interfacial tension, even in the absence of crude oil contact.

In embodiments, oil recovered from crude shale sources is increased by injecting an injectate into a subterranean oil-bearing reservoir, wherein the injectate includes an amount of ws-HNT. In embodiments, a 50% to 500% improvement in amount of oil recovered from oil-soaked shale is observed by injecting the ws-HNT when compared to injecting the same amount of the surfactant, except not imbibed in the ws-HNT. This improvement is completely unexpected, because the amount of surfactant and the surfactant:oil ratio is the same in both injections and the surfactant is presumed to be the active component for extraction of oil from the shale.

Without being limited by theory, we believe that the observed increase in efficacy of surfactant injection in oil recovery processes is caused by the disgorgement of surfactant from the ws-HNT upon contact with an oil. In this respect, we believe the ws-HNT are superior to s-HNT (surfactant loaded HNT) because s-HNT disgorge surfactant on contact with water or a water source, causing loss of surfactant during injection by adsorption or migration to natural subterranean interfaces such as rock and particulate mineral surfaces. In oil recovery processes, it is advantageous to place or disgorge the surfactant where it will contact a crude oil source in order to enhance oil recovery. The injection of ws-HNT into a subterranean reservoir leads to disgorgement of all or a substantial amount of the surfactant loaded in the lumen only after the ws-HNT contacts a crude oil source, leading in turn to observations of increased efficacy by the surfactant on a weight basis.

The exemplary details below are not intended to be limiting and instead are provided to show the breadth of the inventive compositions and methods.

EXPERIMENTAL

Materials

Polyoxyethylene(20) sorbitan monooleate (TWEEN® 80—$C_{64}H_{124}O_{26}$), alkyl (C10-C16) sultaine, ammonium thiocyanate ($NH_4SCN$, ≥97.5%), cobalt(II) nitrate hexahydrate ($Co(NO_3)_2$), methanol ($CH_3OH$), chloroform ($CHCl_3$), sodium chloride (NaCl), n-dodecane ($C_{12}H_{26}$), n-hexane ($C_6H_{14}$, anhydrous 95%), dichloromethane ($CH_2Cl_2$) and paraffin wax (Melting point 70-80° C., determined according to ASTM D 127) were purchased from Millipore Sigma (an affiliate of Merck KGaA of Darmstadt, Germany) and were used without any further purification or modification. For all experiments, the water used was deionized (DI). High salinity synthetic brine used in oil recovery experiments had a composition as shown in Table 1. The pH of the high salinity synthetic brine was 7.5 without adjustment. Eagleford shale outcrops used in the work had porosity of 9.17% and permeability of $1.98 \times 10^{-4}$ mD. Crude oil used in the experiments was Anadarko crude oil which has a density of 912 kg/m³ at 20° C. and a viscosity of 23 mPas at 15° C. Saline water (0.6M NaCl solution in DI water) was used as synthetic seawater where indicated. Raw cores of Camel Lake (CLA) Halloysite nanotubes (HNT) mined in South Australia were obtained and purified using the procedure entitled "Purification of HNT".

TABLE 1

High salinity synthetic brine components.

| Salt | Weight (g/L) |
| --- | --- |
| $CaCl_2 \cdot 2H_2O$ | 4.035 |
| $MgCl_2 \cdot 6H_2O$ | 1.338 |
| NaCl | 117.3 |
| KCl | 1.316 |
| NaBr | 0.773 |

Purification of HNT

A clay block having HNT dispersed therein was sliced into thin sheets and placed in an oven at 70° C. overnight. Then the clay slices were hand-ground in a crucible to result in a fine powder. The powder was dispersed in water, then the supernatant was decanted and powder was re-dispersed in a fresh aliquot of water having pH of 7. The re-dispersed powder was allowed to sit on the lab bench until undispersed solids settled to the bottom of the vessel. Then the liquid was decanted into ajar, and the pH of the decanted liquid was adjusted 5.5, upon which flocculation was observed. Excess water was decanted from the flocculated material, and the flocculated material was placed in an oven at 70° C. until dry.

The dried product was hand-ground to obtain fine powder containing purified HNT.

Characterization of HNT, s-HNT and Ws-HNT

Transmission Electron Microscopy (FEI Tecnai G2 F30 Twin transmission electron microscope operated at 300 kV) and Scanning Electron Microscopy (Hitachi S-4800 Field emission scanning electron microscope operated at 3 kV) were utilized to characterize the morphology of Pristine halloysite nanotubes (HNT), Surfactant (TWEEN® 80) loaded halloysite nanotubes (s-HNT) and wax-coated, surfactant-loaded halloysite nanotubes (ws-HNT).

Elemental analysis was obtained by Energy Dispersive X-ray Spectroscopy (EDS) using a Hitachi S-4700 Scanning electron microscope (SEM/EDS) operated at 15 kV.

Fourier Transform Infra-Red (FTIR) spectroscopy was carried out with Thermo Nicolet Nexus 670 FTIR spectrometer. Each particulate sample was imbibed into Potassium bromide (KBr) powder and pressed into transparent pallets prior to FTIR analysis. X-ray powder diffraction (XRD) was carried out on Siemen D500 X-ray diffractometer, using Cu Ku radiation at 1.54 Å, to determine the crystalline properties of purified CLA HNT, s-HNT and ws-HNT.

To determine the weight percent of surfactant loading and wax coating in prepared ws-HNT particles, thermogravimetric analysis was performed using TA instrument TGA Q500 thermogravimetric analyzer, operated at 5° C./min from 26° C. to 720° C. in nitrogen environment. Percentage weight loss between 26° C. and 700° C. was obtained from TGA plot for each sample. The difference in percentage weight loss between pristine HNT, s-HNT and ws-HNT was used in estimating the weight percent of wax coating and surfactant loading in ws-HNT.

Example 1

Polyoxyethylene (20) sorbitan monooleate, sold under the trade name TWEEN® 80 and used as-is from the supplier, was loaded into the lumen of the purified HNT. First, 0.075 g TWEEN® 80 was dispersed in 6 ml of methanol in a 1 dram vial. Then the entire amount of methanol solution was added to 0.5 g of the purified HNT in a round-bottom flask. The flask was tightly sealed then subjected to three minutes of ultrasonication in a bath sonicator to evenly disperse the HNT in the surfactant solution. Then the sonicated mixture was evaporated using a rotary evaporator connected to a vacuum pump operating at 10 mbar to apply vacuum suction to the sonicated mixture. Pressure was returned to atmospheric condition after about 15 minutes and vacuum suction was immediately applied again. The pressure cycling from vacuum pressure to atmospheric pressure and back to vacuum pressure was carried out twice more, then vacuum was applied and maintained until the methanol was observed to be evaporated, resulting in an evaporated product referred to as "s-HNT1" below.

100 mg of paraffin wax was added to 6 ml of hexane in a vial; then after tightly capping, the vial was subjected to ultrasonication for 5 minutes. Then the vial was placed in a heating bath set to 40° C. until the wax was observed to be completely dissolved. The wax solution was then added to 500 mg of the s-HNT1 in a round bottom flask and this mixture was placed in a rotary evaporator with the bottom of the flask immersed in a heating bath set to 40° C. The mixture was stirred at 150 rpm for 30 minutes. Then the mixture was removed from the heating bath and vacuum (200 mbar) was applied to evaporate the hexane and solidify the wax. The evaporated product is referred to as "ws-HNT1" below.

Comparative Example 1

The paraffin wax process of Example 1 was repeated with an amount of the purified HNT (no surfactant imbibition) to form an evaporated material having a 1:5 mass ratio of wax to HNT. The wax-coated HNT is referred to as "w-HNT" below.

To understand the rate of wax dissolution in crude oil, 10 mg w-HNT was added to 2 ml of n-dodecane and the mixture was stirred gently at 200 rpm on an orbital shaker at room temperature. At time intervals, the suspension was centrifuged at 6000 rpm for 15 seconds, then 10 µL of supernatant was removed for analysis. The particles were re-dispersed in the supernatant and returned to the orbital shaker for continued stirring. Each 10 µL sample of supernatant was dissolved in 1 ml of dichloromethane. The concentration of wax dissolved in dodecane was analyzed by gas chromatography.

Example 2

An alkyl sultaine surfactant-loaded HNT was formed using the general procedure of Example 1 to form s-HNT2 by loading HNT with C10-C16 alkyl (2-hydroxy-3 sulfopropyl)dimethyl betaine. Then 30 mg of paraffin wax was dissolved in 4 ml of hexane and placed in a heating bath (40° C.) and stirred for about 10 minutes. The resulting solution was added to a round bottom flask containing 500 mg of s-HNT2. The flask was placed in a rotary evaporator operated at 40° C. Vacuum was applied to the rotating system (80 rpm) until the hexane was evaporated. The evaporated product is referred to as "ws-HNT2" below.

Example 3

A dispersion of ws-HNT1 in 0.6M NaCl solution (synthetic seawater) was used to test the effectiveness of wax in preventing the release of TWEEN® 80. First, 20 mg of ws-HNT1 was weighed into a vial containing 20 ml of saline water at room temperature and stirred continuously with a magnetic stir bar at 200 rpm. Then 0.75 m samples were drawn from the vial at different time intervals to analyze for the concentration of TWEEN® 80 present in solution. Sampling was carried out for 3 hours after which the vials were placed in a heating bath at 80° C. for 2 hours to trigger the melting of the wax and concomitant disgorgement of surfactant.

Concentration of TWEEN® 80 surfactant present in the saline solution (that is, surfactant disgorged from a ws-HNT or an s-HNT composition) was analyzed using the cobalt thiocyanate active substances (CTAS) UV-Vis Spectroscopy technique for determining TWEEN® 80 in part per million (ppm) concentration. CTAS reagent was prepared by adding 10 g of ammonium thiocyanate and 1.5 g of cobalt (II) nitrate hexahydrate in 50 ml of deionized water. CTAS reagent was made fresh for each batch of analysis to avoid oxidation which may affect the accuracy of absorbance measured. To each 0.75 ml of aqueous sample drawn from the release vial, 0.75 ml of CTAS reagent was added and vortexed for 2 minutes to form cobalt thiocyanate-polyethoxylate colored ion complex. 3 ml of chloroform was then added to extract the cobalt thiocyanate-polyethoxylate complex from the aqueous phase.

UV-visible spectrophotometry (Shimadzu UV-1700, obtained from Shimadzu Instruments of Kyoto, Japan) was used to measure the absorbance of the chloroform phase containing the cobalt thiocyanate-polyethoxylate complex at 620 nm. TWEEN® 80 concentration for each sample analyzed was then extrapolated from an absorbance vs. concentration calibration curve of known concentrations of TWEEN® 80. Experiments were carried out in triplicates.

When placed in saline solution, s-HNT1 disgorged about 80 wt % of the loaded surfactant in the lumen as calculated within one hour, based on the amount measured after placement in the heating bath at 80° C. for 2 hours. The ws-HNT1, added in an amount calculated to provide the same amount of surfactant as the s-HNT1, released only about 40 wt % of the surfactant in the same period of time. We repeated the experiment after first washing the ws-HNT1 with water to remove surfactant residing on the surface of the particles, and observed no surfactant when the sample was placed in saline. When the cleaned ws-HNT in saline was heated to 80° C. for 2 hours, the surfactant was disgorged.

Example 4

15 mg of ws-HNT1 was placed in a 2 dram vial. 3 ml of synthetic seawater (0.6 wt % NaCl) was added to the vial to provide 0.5 wt % ws-HNT in synthetic seawater. The resulting suspension was sonicated for approximately 2 minutes. 1 ml of dodecane was added to the vial making a 1:3 volume ratio of dodecane to synthetic seawater. The vial contents were mixed using a vortex mixer at 3000 rpm for 3 minutes, resulting in a mixture having a visible oil-water interface. Using a plastic dropper pipette, small aliquots of the mixture were taken just above the interface, placed on a glass slide and imaged under a Nikon eclipse LV100 optical microscope. Droplet size analysis was performed on the optical microscope images. Average droplet size was obtained from a distribution of 200 droplets. To prepare samples for imaging, small aliquots of the dodecane-water mixture were placed in a special cell and plunged into liquid nitrogen. Frozen samples were fractured at −130° C. with the aid of a cold flat edged knife to reveal emulsion droplets after which solvent was sublimed at −85° C. for 5 minutes.

Then the dodecane-water mixtures were characterized by Cryogenic Scanning Electron Microscopy (Cryo-SEM) using a Field Emission Scanning Electron Microscope operated at 3 kV.

Figure 1:
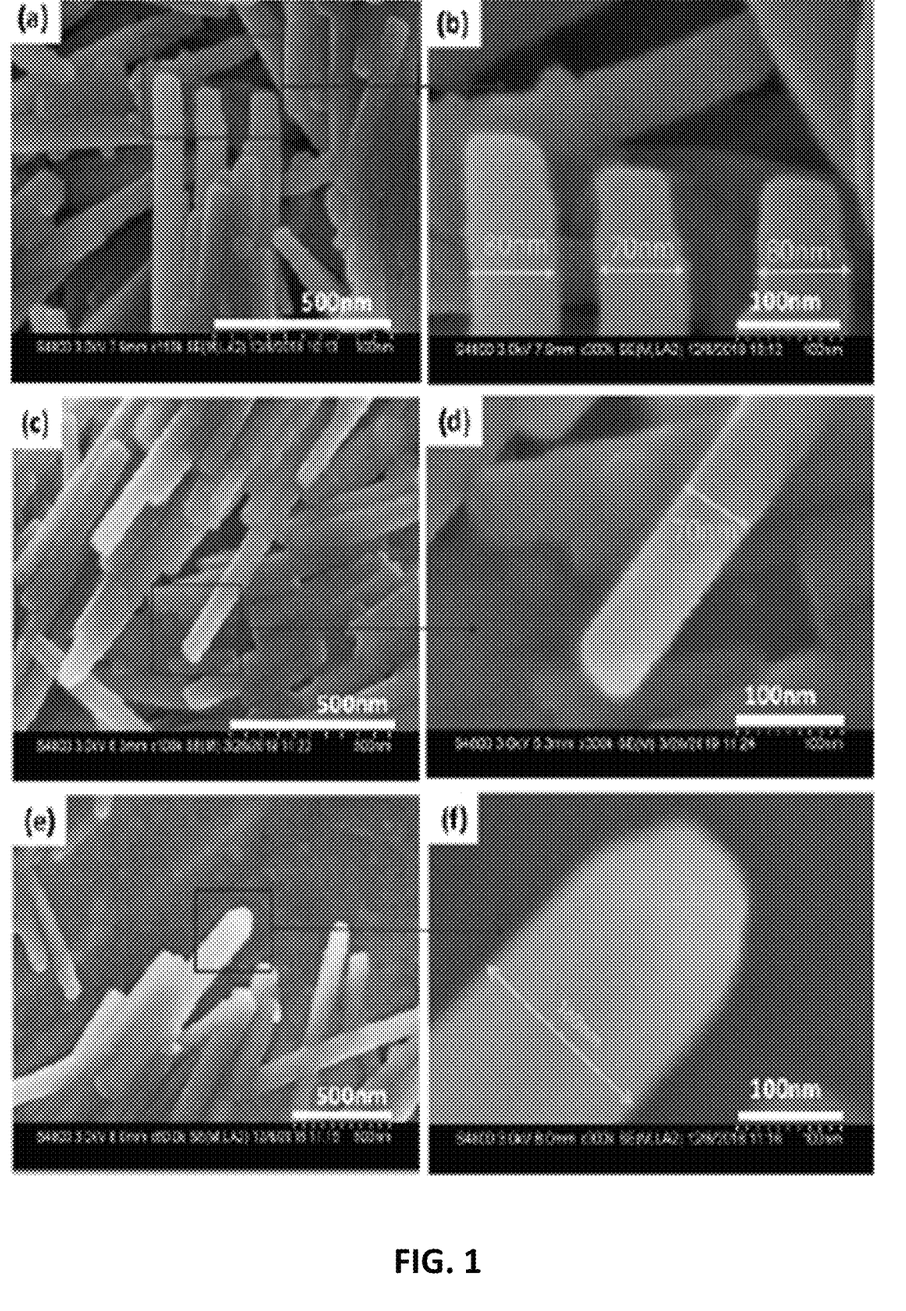
FIG. 1(a)-1(f) are micrographs showing surface features of Halloysite nanotubes.

SEM images of the pristine HNTs are provided in FIG. 1(a), while FIG. 1(b) shows the area of detail indicated in FIG. 1(a) at greater magnification. SEM images of corresponding magnification showing s-HNT are provided in FIGS. 1(c) and 1(d). SEM images of corresponding magnification showing ws-HNT1 are provided in FIGS. 1(e) and 1(f). The HNT and s-HNT both have an average diameter based on visual inspection of about 60-80 nm, while ws-HNT1 has an average diameter based on visual inspection of about 120-180 nm. FIGS. 1(e) and 1(f) further show that the ws-HNT1 have a cylindrical morphology consistent with discrete HNT particulates, without the appearance of significant aggregation of HNTs due to the presence of the wax coating.

Example 5

Each particulate sample was compacted in a pellet die and pressed into a 13 mm disk pellet with about 1 mm thickness using a hydraulic press. Contact angle was measured by placing each sample pellet in a contact angle goniometer (Ramé-Hart Model 250, obtained from Ramé-Hart Instrumentation Co. of Randolph, N.J.) and dispensing 5 µL water from a 21 gauge needle onto the sample followed by a period of equilibration. Images of the droplets on the samples were captured and three-phase contact angle at the interface between water, dodecane or air and solid sample at room temperature was measured by DROPimage Advanced Software supplied with the goniometer.

Contact angle was observed to increase from about 8° with pristine HNT to 54 with ws-HNT1, indicating an increase in hydrophobicity upon wax coating.

Dynamic Interfacial Tension (DIFT) studies were carried out by goniometer using the pendant drop technique. Thus, 5 mg of ws-HNT1 was dispersed in 5 ml of saline water at 25° C., and 20 µL of the dispersion was drawn from the vial with a 21 gauge flat tip needle using an automatic dispenser. The needle was plunged into a glass cuvette containing 5 ml of dodecane, and 15 µL was injected into the dodecane. Drop shape analysis performed with DROPimage Advanced Software was used to measure the change in water-dodecane interfacial tension over time. As control, DIFT measurement was performed with w-HNT under similar conditions to determine the interfacial activity of the particles without surfactants for comparative purposes. The w-HNT had no effect on the oil-water interfacial tension with values remaining around 40±1 mN/m, the intrinsic oil-water interfacial tension. The ws-HNT1 provided interfacial tension of 15 mN/m within 2 minutes. The sharp drop in interfacial tension is clearly due to the release of surfactant from the ws-HNT. The s-HNT provided interfacial tension of 11±0.5 mN/m in less than 2 minutes.

Example 6

Eagleford cores were crushed using a crucible and sieved to a mesh size between 20-50 mesh (about 300-800 µm). About 3 g of the crushed, sieved core material was placed in a 2-dram vial and Anadarko crude oil was added to the vial in an amount sufficient to submerge the core material. The vial was sealed and placed in a water bath set to 55° C. for 7 days after which the excess oil was drained off and the oil saturated cores were stored in a vial and kept in a nitrogen-filled enclosure.

Capillary tubes (Length 10 mm, inner diameter 1.5 mm) were tightly packed with a mixture of freshly crushed, sieved core material (fresh core) and oil saturated core material (oil-saturated core), both core materials having a sieved size of about 20 mesh, or 300 μm. The tubes were packed using a capillary packing length ratio of fresh core to oil-saturated core of 2:1. The fresh core end of the capillary was connected to a syringe pump containing either a solution of the alkyl sultaine surfactant used to make ws-HNT2 in brine, or a dispersion of ws-HNT2 in brine. Before the start of the experiments, about 10 pore volume (PV) of brine was flowed through the capillary to ensure compactness and remove any air pockets.

As a control example, brine alone was flowed through the capillary and the filled capillary was stored for various time intervals (up to 20 days) at 25° C.

As a first comparative example, 1 PV of a solution of 1000 ppm C10-C16 alkyl (2-hydroxy-3-sulfopropyl)dimethyl betaine (obtained from ChampionX of The Woodlands, Tex.) in brine was flowed through the capillary and the filled capillary was stored for the same time intervals under the same conditions as the control brine.

For measurement of ws-HNT2, a dispersion of ws-HNT2 in brine having the same total amount of the surfactant in the dispersion as the surfactant solution (about 2 mg) was added in its entirety to the open end of the capillary, then 1 PV of brine was flowed through the capillary after it. The filled capillary was then stored for the same time intervals under the same conditions as the control brine.

In a second comparative example, a dispersion of w-HNT in brine having the same total amount of the HNT in the dispersion as the ws-HNT2 dispersion was added in its entirety to the open end of the capillary, then 1 PV of brine was flowed through the capillary after it. The filled capillary was then stored for the same time intervals under the same conditions as the control brine.

At specific time intervals, 5 PV of brine was flowed through each of the filled capillaries, and oil recovered from the eluted liquid was collected and measured using UV-Vis spectroscopy. The amount of oil recovered was determined by comparison of the experimental spectra to a calibration curve generated using the UV-Vis spectroscopy of some of the aromatic components of the crude oil whose concentration in the oil are known.

Figure 2:
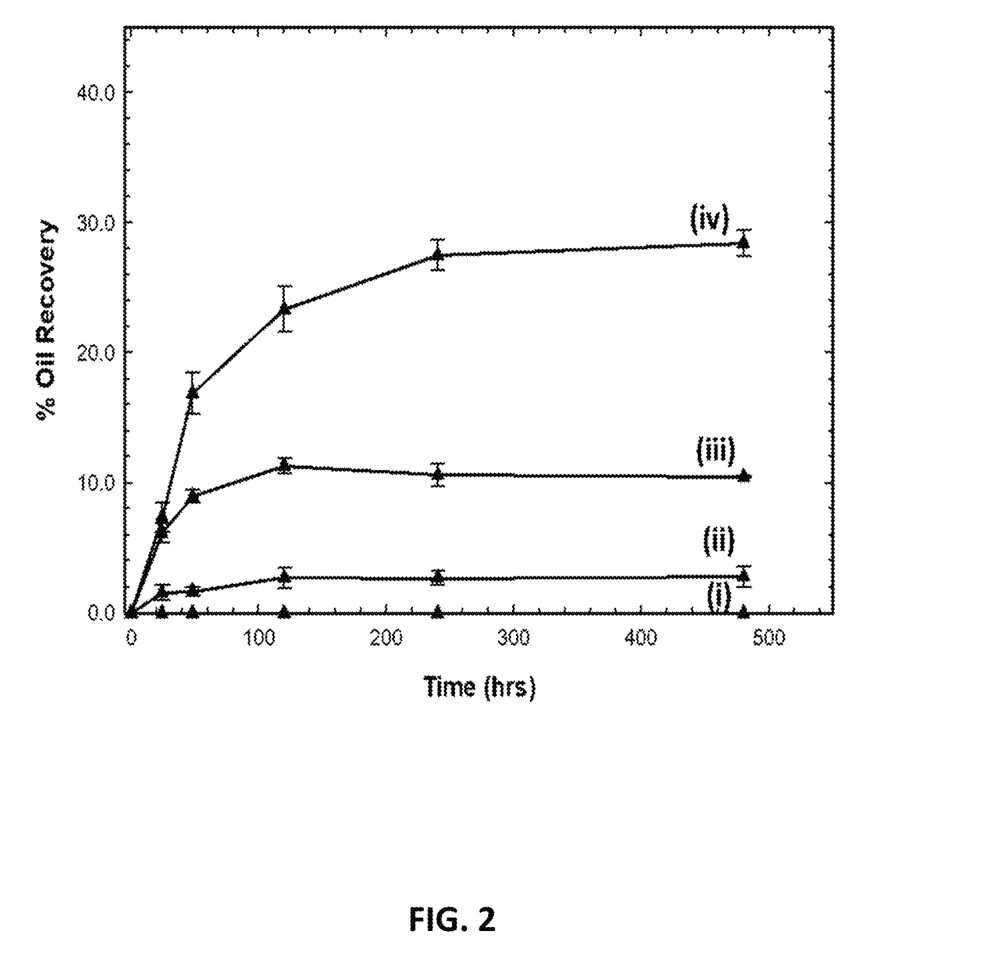
FIG. 2 is a plot of percent oil recovered from shale core material as a function of time for compositions including Halloysite nanotubes.

Results of the measurements are shown in FIG. 2. At 25° C., no oil recovery was observed over 20 days in the control (brine alone), as shown in FIG. 2, line (i). Oil recovery of about 2% was observed for w-HNT (second comparative example), as shown in FIG. 2 (ii). Oil recovery of about 10% was observed for the surfactant alone (first comparative example), as shown in FIG. 2 (iii). A significantly greater amount of oil recovery, 27% was observed for ws-HNT2, as shown in FIG. 2 (iv), representing a 170% improvement in oil recovered from the oil-soaked cores compared to recovery obtained using the same surfactant in the same amount and under the same conditions, but without being imbibed and wax-coated. Further referring to FIG. 2, the percent oil recovered by ws-HNT2 as shown in FIG. 2 (iv) is greater than additive when compared to the combined oil recovered in (ii) and (iii)—that is, the combined results of oil recovered employing surfactant, plus oil recovered employing w-HNT.

Example 7

Figure 3:
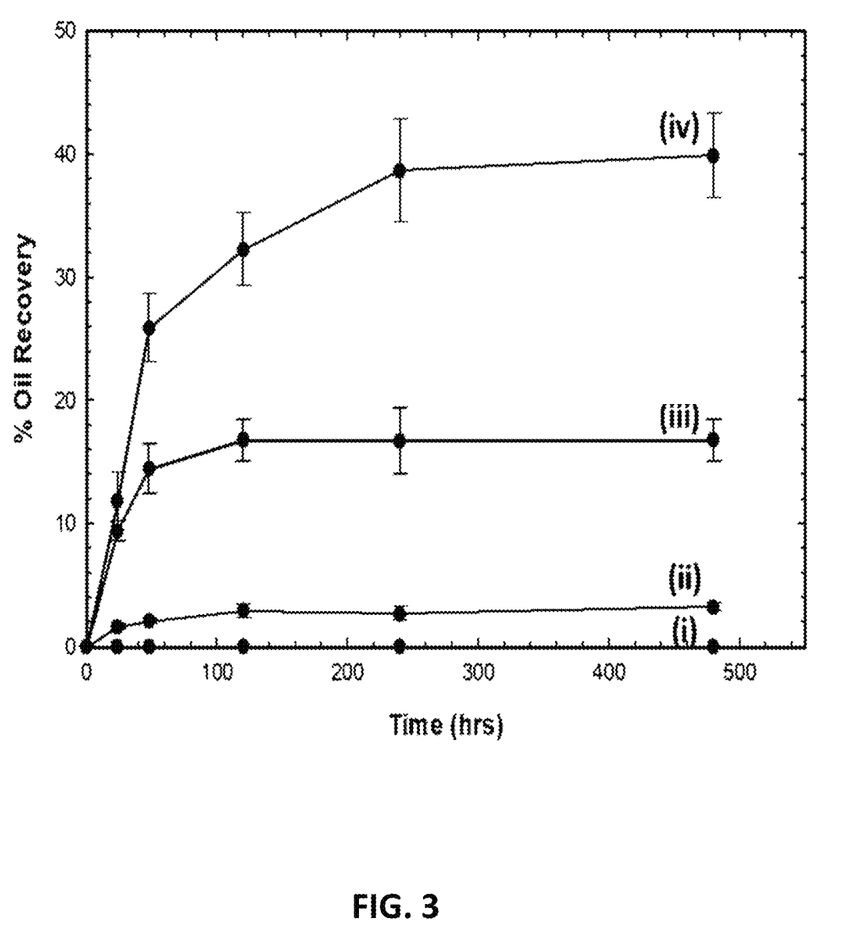
FIG. 3 is another plot of percent oil recovered from shale core material as a function of time for compositions including Halloysite nanotubes.

Example 6 was repeated except that the filled capillaries were stored at 70° C. instead of 25° C. Results of the measurements are shown in FIG. 3. Oil recovery of about 14% was observed for the surfactant alone (first comparative example), as shown in FIG. 3 (iii). A significantly greater amount of oil recovery, 40% was observed for ws-HNT2, as shown in FIG. 3 (iv), representing a 186% improvement in oil recovered from the oil-soaked cores when compared to recovery obtained using the same surfactant in the same amount and under the same conditions, but without being imbibed and wax-coated.

Further referring to FIG. 3, the percent oil recovered by ws-HNT2 as shown in FIG. 3 (iv) is greater than additive when compared to the combined oil recovered in (ii) and (iii)—that is, the combined results of oil recovered employing surfactant, plus oil recovered employing w-HNT.

What is claimed is:

1. An injectate composition comprising:
   (i) a water source; and
   (ii) a nanotube composition comprising
      (a) halloysite nanotubes, each of the halloysite nanotubes having an outer surface and an inner surface defining a lumen and further defining lumen distal ends,
      (b) one or more surfactants disposed within the lumen, and
      (c) a wax disposed on a portion of the outer surface wherein the one or more surfactants are not disgorged from the lumen into the water source,
   wherein the injectate composition comprises about 1 part to 10,000 parts by weight of the nanotube composition dispersed in 1,000,000 parts by weight of the water source.

2. The injectate composition of claim 1 wherein the wax extends to cover a portion of the lumen distal ends.

3. The injectate composition of claim 1 wherein the wax covers a substantial portion or the entirety of the lumen distal ends.

4. The injectate composition of claim 1 wherein the wax covers the entire outer surface of each of the halloysite nanotubes and covers the lumen distal ends.

5. The injectate composition of claim 1 wherein the one or more surfactants are nonionic and nonpolymeric.

6. The injectate composition of claim 1 wherein a weight ratio of the one or more surfactants to the halloysite nanotubes is 1:1 to 1:100.

7. The injectate composition of claim 1 wherein a weight ratio of the wax to the one or more surfactants and each of the halloysite nanotubes combined is 10:1 to 1:100.

8. The injectate composition of claim 1 wherein the wax is a petroleum wax or a plant wax.

9. The injectate composition of claim 1 wherein the one or more surfactants comprise a nonionic surfactant.

10. The injectate composition of claim 1 wherein the one or more surfactants comprise an amphoteric surfactant.

11. The injectate composition of claim 1 wherein the one or more surfactants comprise an ionic surfactant.

12. The injectate composition of claim 1 wherein the water source comprises 0.1 wt % to 5 wt % dissolved solids.

13. The injectate composition of claim 1, the injectate composition further comprising one or more viscosity adjustment agents, scale control reagents, buffers, or anticorrodents.

14. The injectate composition of claim 1, the injectate composition further comprising a proppant.

15. A method of hydraulic fracturing, the method comprising: hydraulically fracturing a subterranean reservoir; and injecting the injectate composition of claim 14 into the subterranean reservoir during the hydraulic fracturing.

16. A method of oil recovery, the method comprising: injecting an injectate composition of claim 1 into a subterranean reservoir; and collecting a hydrocarbon.

17. The method of claim 16, wherein the one or more surfactants are disgorged from the lumen after the nanotube composition contacts a crude oil source.

18. The method of claim 16, wherein the one or more surfactants are disgorged from the lumen after the nanotube composition contacts a subterranean temperature that exceeds a melt transition temperature of the wax.

19. A method of making an injectate, the method comprising:
- imbibing a halloysite nanotube (HNT) with a surfactant to form a surfactant-imbibed HNT (s-HNT), wherein the surfactant is imbibed into a lumen defined by the halloysite nanotube;
- contacting the s-HNT with a wax to form a wax-coated, surfactant-imbibed HNT (ws-HNT); and
- dispersing 1 part to 10,000 parts by weight of the ws-HNT in 1,000,000 parts by weight of a water source to form the injectate, wherein the ws-HNT does not disgorge the surfactant from the lumen into the water source.

20. The method of claim 19, wherein the wax is dispersed or dissolved in a solvent that does not disperse or dissolve the surfactant.

* * * * *